(12) United States Patent
Siber et al.

(10) Patent No.: US 8,607,908 B2
(45) Date of Patent: Dec. 17, 2013

(54) INTAKE SYSTEM OF COMBUSTION AIR OF A VEHICLE

(75) Inventors: Ralf Siber, Mainz (DE); Wolfgang Fasan, Erbach (DE); Torsten Lang, Budenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/253,115

(22) Filed: Oct. 5, 2011

(65) Prior Publication Data

US 2012/0085307 A1  Apr. 12, 2012

(30) Foreign Application Priority Data

Oct. 7, 2010  (DE) .................. 10 2010 047 851

(51) Int. Cl.
  *B60K 13/02*  (2006.01)
(52) U.S. Cl.
  USPC ....................................... 180/68.3
(58) Field of Classification Search
  USPC ....... 180/68.1, 68.2, 68.3; 123/198 E, 198 A; 55/385.3, 490, 502, 505, 513; 96/106, 96/273; 181/243

See application file for complete search history.

(56) References Cited

U.S. PATENT DOCUMENTS

| | | | |
|---|---|---|---|
| 6,510,832 B2 * | 1/2003 | Maurer et al. ............ | 123/198 E |
| 7,069,893 B2 * | 7/2006 | Cusumano et al. ....... | 123/184.21 |
| 7,455,042 B2 * | 11/2008 | Jacobi-Hinderer ....... | 123/198 E |
| 2005/0280268 A1 * | 12/2005 | Dehn et al. .................... | 293/120 |

FOREIGN PATENT DOCUMENTS

DE  102005009768 A1  9/2006

* cited by examiner

*Primary Examiner* — John Walters
*Assistant Examiner* — James Triggs
(74) *Attorney, Agent, or Firm* — Ingrassia Fischer & Lorenz, P.C.

(57) ABSTRACT

An intake system of combustion air is provided for a vehicle. The intake system has an intake opening, an intake duct, and an air filter. The intake opening is situated on one side of a water separation container, which is fixed on a girder of the vehicle. The intake opening is situated in a front most front face of the vehicle in the travel direction for this purpose.

10 Claims, 2 Drawing Sheets

INTAKE SYSTEM OF COMBUSTION AIR OF A VEHICLE

CROSS-REFERENCE TO RELATED APPLICATION

This application claims priority to German Patent Application No. 102010047851.2, filed Oct. 7, 2010, which is incorporated herein by reference in its entirety.

TECHNICAL FIELD

The technical field relates to an intake system of combustion air of a vehicle, the intake system has an intake opening, an intake duct, and an air filter.

BACKGROUND

A vehicle body front structure having pedestrian protection device is known from the publication DE 10 2005 009 768 A1, the front side having a crossbeam which holds a parallel element made of an impact-absorbing material. The parallel element is implemented as an air conduction box having an air inlet shaft below the crossbeam and the parallel element on the front side and an open rear side toward an engine heat exchanger for coolant air guiding, a peripheral frame forming a frame, which encloses the heat exchanger. Since the air inlet shaft is situated below the crossbeam and below the parallel element, sprayed water and dust can be fed to the heat exchanger via this pedestrian protection device.

Therefore, at least one object is to provide an intake system for combustion air of a vehicle, in which this problem is avoided.

SUMMARY

An intake system for combustion air, which has an intake opening, an intake duct, and an air filter, is proposed as an embodiment of the intake system. The intake opening is situated on one side of a water separation container, which is fixed on a carrier of the vehicle. The intake opening is situated in a front most front surface of the vehicle in the travel direction for this purpose.

Through the arrangement of the intake opening for combustion air of the vehicle in a front most front surface of the vehicle in the travel direction, which is mounted farthest in front of all other external surfaces of the vehicle, combustion air of a vehicle is ensured by this intake system, so that no air which is preheated by the engine heat, for example, is supplied to the intake system. A second advantage is that the highest ram pressure is applied to the front face of the vehicle, so that the combustion air to be compressed can be fed with a high ram pressure to an internal combustion engine. Furthermore, by the arrangement of the intake opening above the girder on one side of a water separation container, which is situated using its base on the girder, the intake opening is placed sufficiently high in the front face that the received sprayed water fraction is significantly less than in the case of the intake opening known from the above publication, which is situated below the girder.

The fraction of the water, which is received by the intake opening in spite of the optimum arrangement of the intake opening above the girder and on a front face of the vehicle, can advantageously be withdrawn by the water separation container from the combustion air of the vehicle. Pre-dried air, which can be provided to a turbocharger for compression with minimal flow resistance, is therefore available for the intake duct, which is situated further downstream from the water separation container, and the air filter.

The water separation container has a soft, yielding rubber-elastic material and is situated in a central upper front area of the vehicle and therefore forms a pedestrian protection device. For this purpose, the water separation container has a base having a base profile, which is adapted to the profile of the girder of the vehicle and envelops the girder on the front side, top side, and rear side. The girder can be the front crossbeam. The fraction of the water separation container that has its base area protruding frontally beyond the front crossbeam provides the greatest contribution to damping an impact of a pedestrian.

An affect, which absorbs impact energy, can be amplified still further in that a corresponding structure, which absorbs impact energy, is situated inside the water separation container. Through such a water separation container, the required deformation spaces in the area of the engine hood, which are to be provided in the area of the possible thigh and hip impact regions, can be provided, and simultaneously this front area is used to feed pre-dried combustion air to the intake system.

A coolant air inlet for an engine radiator can be provided below the water separation container and therefore also below the girder, for example, the front crossbeam, the inlet being able to be terminated at the bottom by a pedestrian crossbeam, this pedestrian crossbeam also being produced from a relatively yielding material and optionally even from the same material which the water separation container comprises. This lower pedestrian crossbeam, which delimits the coolant air inlet for the engine radiator below the front crossbeam of the vehicle, additionally improves the pedestrian protection in case of a frontal collision with the vehicle.

The pedestrian can be prevented from sliding below the automobile by this lower pedestrian crossbeam. Rather, the lower leg of the pedestrian is supported, so that his upper body is set into a rotational movement in the event of an impact on the vehicle, which is oriented toward the top side of the vehicle, so that a frontal impact of a pedestrian on the frontal vehicle body structure of the vehicle can occur with fewer injuries for the pedestrian. Accidents of a frontal impact of a pedestrian on the frontal vehicle body structure having the yielding water separation container and the pedestrian crossbeam can therefore be less harmful than heretofore.

In addition, it is provided that the water separation container has a water outlet opening. This water outlet opening can be implemented as tubular, the opening of the tube being oriented opposite to the travel direction in order to form a suction direction for the draining water. In its upper volume area, the water separation container can have an outlet opening to the intake duct, which is situated at least laterally offset to the intake opening, in order to ensure that, for example, the rear side of the water intake container is used as a baffle plate for water droplets penetrating the intake opening.

Moreover, additional baffle structures can be provided in the water separation container, in order to capture the water droplets with the aid of hydrophobic surfaces and cause the water to drip off the baffle structure to the base area of the water separation container. For this purpose, in addition to the rear wall, baffle plates can also be situated in the travel direction between the inlet opening and the outlet opening of the water separation container, which is situated offset.

In a further embodiment, it is provided that an air conduction duct to an engine heat exchanger is formed between a rear wall of the water separation container and a front side of the engine heat exchanger. For this purpose, the rear wall of the water separation container is formed as an air conduction surface for coolant air to the engine heat exchanger.

The coolant air for the engine heat exchanger is horizontally received through the already above-mentioned coolant air inlet below the base of the water separation container, which forms the entry to the air conduction duct. The coolant air is then deflected in a vertical direction by corresponding air conduction plates. From the vertical direction, the coolant air is deflected by the rear wall of the water separation container, which is formed as an air conduction surface, to a horizontal direction toward a front side of the engine heat exchanger. For this purpose, the rear side of the water separation container has an S-shaped contour. In addition, the air conduction duct narrows upward until finally an upper edge of the water separation container is engaged with an upper edge of the engine heat exchanger and therefore terminates the air conduction duct. Through the S-shaped contour of the rear wall of the water separation container, the penetrating coolant air for the engine heat exchanger advantageously experiences a twofold direction change, namely from a horizontal flow to a vertical flow and from a vertical flow to a horizontal flow.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
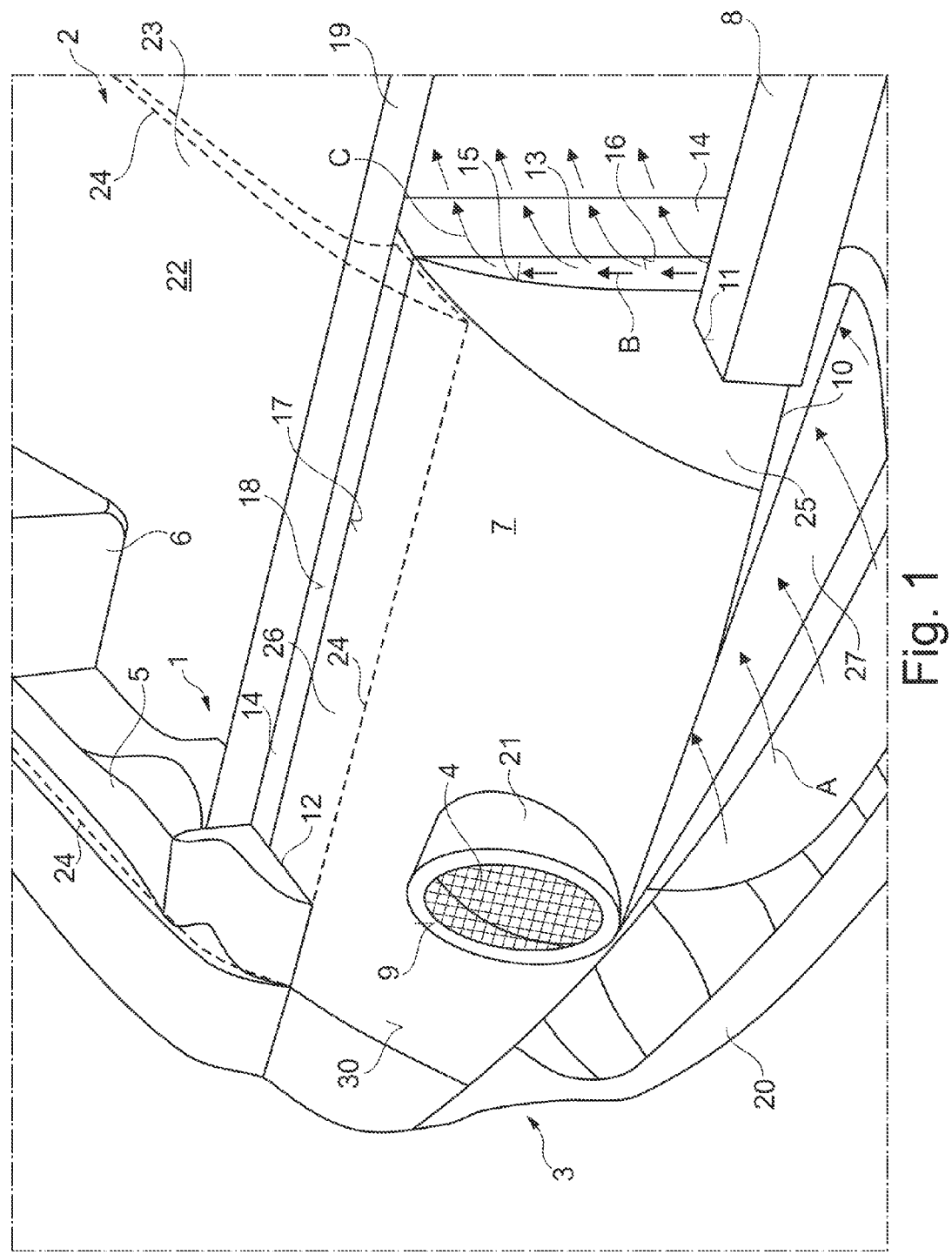
FIG. 1 shows a schematic, perspective partially cutaway view of an intake system of combustion air according to one embodiment.

FIG. 1 shows the schematic, perspective partially cutaway view of the intake system 1 of combustion air of a vehicle 2, an intake opening 4, an intake duct 5, and an air filter 6, which are situated in a front area 3 of the vehicle 2. The intake opening 4 is situated in the forward most front face 9 of the vehicle 3. The intake opening 4 is located on a snout-like cylinder attachment 21, which protrudes out of the front area 3, made of soft, yielding rubber-elastic material. In addition, the intake opening 4 is situated above a girder of the vehicle body, which is the front lower crossbeam 8 of the vehicle body in this embodiment. A further so-called pedestrian crossbeam 20, which is produced from soft, yielding material, is provided below the front lower crossbeam 8, which protrudes frontally above the front lower crossbeam of the vehicle body.

Downstream from the cylinder attachment 21, it merges into a water separation container 7, which forms an extensive area of the front area 3. Its outer forward front side 30 is aerodynamically shaped and forms a part of the outer frontal view of the vehicle 2 and merges in its upper area into an engine hood 23, whose contour is indicated in this partially cutaway view by dashed lines 24.

The outer front side 30 of the water separation container 7 therefore merges directly into the front side 22 of the engine hood 23. An attachment-free, aerodynamic surface therefore results in the front area 3 of the vehicle 2, which simultaneously forms a shock-damping surface in the event of a frontal impact of a pedestrian due to the yielding material of the frontally protruding water container. The cooperation of the water separation container 7 with the lower pedestrian crossbeam 20 forms an improved pedestrian protection in case of a frontal collision of the vehicle with a pedestrian. Such a pedestrian protection device made of the yielding material of the lower pedestrian crossbeam 20 and the water separation container 7 reduces the danger of the pedestrian sliding below the automobile and causes a support of the lower leg of the pedestrian who is run into, so that his upper body is set into a rotational movement in the event of an impact on the vehicle 2, which is oriented toward the top side of the vehicle 2, so that the pedestrian can be caught or received by the engine hood 23.

The base 10 of the water separation container 7 is profiled in such a way that its base profile 11 envelops the forward lower crossbeam 8 on the front side, the top side, and the rear side. The water separation container 7 can be clipped onto the forward lower crossbeam 8 using this base profile 11 during the installation. A predominant part of a base area 25 of the water separation container 7 protrudes in the travel direction from the forward lower crossbeam 8, so that it inhibits a frontal impact of a pedestrian and protects him from the forward lower crossbeam 8 of the vehicle body.

A structure which absorbs impact energy can be situated inside the water separation container 7 and baffle surfaces can be provided, which, using their hydrophobic surface, separate water droplets from the combustion air which flows through the intake system and collect them in the base area 25 of the water separation container 7, so that the water can be drained out of an outlet situated in the base area 25. An outlet opening 12 for the combustion air which is pre-dried in the water separation container 7 is provided laterally offset to the intake opening 4 in an upper edge area 26, the opening 12 merging into the intake duct 5, which feeds the pre-dried combustion air to the air filter 6 situated downstream from the intake duct 5.

An engine heat exchanger 14 is situated behind the water separation container 7 in the travel direction in the area of an upper crossbeam 19, an air conduction duct 13 being situated between a rear wall 15 of the water separation container 7 and a front side 16 of the engine heat exchanger 14, for which the S-shaped rear wall 15 of the water separation container 7 forms an air conduction surface. The air conduction duct 13 is terminated at the top at an upper edge 18 of the engine heat exchanger 14. A corresponding upper edge 17 of the water separation container 7, which is curved opposite to the travel direction, is engaged with the upper edge 18 of the heat exchanger 14 for this purpose.

The air conduction duct 13 conducts the coolant air from a coolant air inlet 27, which is situated below the base 10 of the water separation container 7, to the front side 16 of the engine heat exchanger 14. The flow direction of the coolant air is changed twice by nearly approximately 90°, namely once from a horizontal coolant air flow in the arrow direction A after the coolant air inlet 27 into a partially vertical flow in the arrow direction B in the air conduction channel 13, which in turn merges into a horizontal coolant air flow in the arrow direction C to the engine heat exchanger 14. The material and cost expenditure for corresponding air conduction parts can thus be reduced by the water separation container 7.

In addition, the installation for this coolant air guide is simplified, because the water separation container can be clipped onto the forward lower crossbeam. An impact zone, which damps the impact of a person, results with the water separation container in the forward area of the vehicle.

Through the voluminous water separation container 7, the sucked-in combustion air can be separated from water and foreign bodies without great flow resistances, which improve the engine performance through the supplied dry combustion air and therefore allow advantages in the fuel consumption. In addition, the operational reliability of the vehicle is increased, since failures of the engine operation are reduced by the relatively high intake position of the intake opening 4 when traveling through water.

Figure 2:
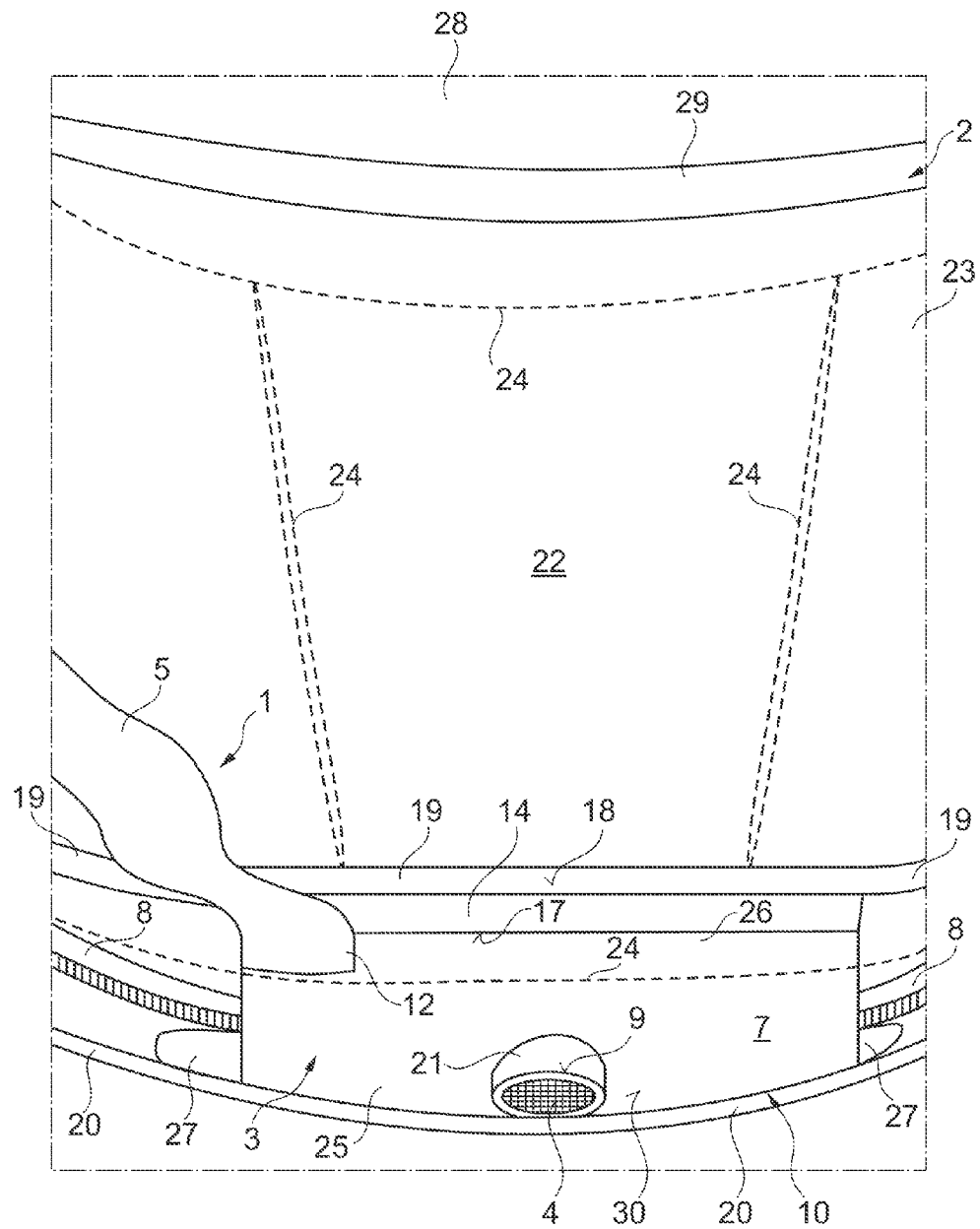
FIG. 2 shows a schematic top view of the intake system according to FIG. 1.

FIG. 2 shows a schematic top view of the intake system according to FIG. 1. Components having identical functions as in FIG. 1 are identified by identical reference numerals and are not explained separately. The top view shows that a predominant part of the front area 3 is now constructed from a yielding, soft rubber-elastic material, before, in the front area 3, the yielding parts merge without attachments into the sheet-metal contour of the engine hood 23, which is shown by dashed lines 24. At the end of the engine hood 23, the windshield 28 having its frame 29 is visible. In addition, it can be recognized that the lower pedestrian crossbeam 20 protrudes slightly beyond the water separation container in the travel direction, and therefore allows the above-mentioned rotational movement of the upper body of a pedestrian in the event of a collision.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. An intake system of combustion air of a vehicle, comprising:
    a water separation container that is fixed on a girder of the vehicle, wherein the water separation container comprises a base having a base profile that is adapted to a girder profile of the girder and envelops the girder on a front side, a top side, and a rear side; and
    an intake opening that is situated on one side of the water separation container, and
    wherein the intake opening is situated in a forward most front face of the vehicle in a travel direction.

2. The intake system according to claim 1, wherein the water separation container is situated in a central upper front area of the vehicle and forms a pedestrian protection device.

3. The intake system according to claim 1, wherein the water separation container forms an impact damper and has a soft and yielding rubber-elastic material.

4. The intake system according to claim 1, further comprising a structure configured to absorb impact energy that is situated inside the water separation container.

5. The intake system according to claim 1, wherein a base of the water separation container comprises a water outlet opening.

6. The intake system according to claim 1, wherein the water separation container comprises an outlet opening to the intake duct in an upper volume area that is laterally offset to the intake opening.

7. The intake system according to claim 6,
    wherein a baffle structure comprising a hydrophobic surface that is configured to separate water droplets, and
    wherein the hydrophobic surface is situated inside the water separation container between the intake opening and an outlet opening.

8. The intake system according to claim 1, further comprising an air conduction duct to an engine heat exchanger that is situated between a rear wall of the water separation container and a front side of the engine heat exchanger.

9. The intake system according to claim 8, wherein the rear wall of the water separation container comprises an air conduction surface for coolant air to the engine heat exchanger.

10. The intake system according to claim 8, wherein an upper edge of the water separation container is engaged with an upper edge of the engine heat exchanger.

\* \* \* \* \*